United States Patent
Hynecek

(10) Patent No.: US 7,825,971 B2
(45) Date of Patent: Nov. 2, 2010

(54) LOW NOISE IMAGE SENSING SYSTEM AND METHOD FOR USE WITH SENSORS WITH VERY SMALL PIXEL SIZE

(75) Inventor: Jaroslav Hynecek, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1553 days.

(21) Appl. No.: 10/683,966

(22) Filed: Oct. 10, 2003

(65) Prior Publication Data

US 2005/0078205 A1    Apr. 14, 2005

(51) Int. Cl.
*H04N 5/335*    (2006.01)
(52) U.S. Cl. ........................... 348/297; 348/311
(58) Field of Classification Search ......... 348/294–297, 348/311–316
See application file for complete search history.

(56) References Cited

U.S. PATENT DOCUMENTS

| | | | |
|---|---|---|---|
| 4,035,629 A | 7/1977 | Lampe et al. | |
| 5,264,940 A * | 11/1993 | Komiya et al. | 348/298 |
| 5,365,269 A * | 11/1994 | Holmes et al. | 348/297 |
| 5,630,064 A * | 5/1997 | Ishibashi et al. | 340/10.2 |
| 6,111,279 A | 8/2000 | Nakashiba | |
| 6,320,616 B1 | 11/2001 | Sauer | |
| 6,549,235 B1 | 4/2003 | Fossum et al. | |
| 6,573,784 B2 | 6/2003 | Gower et al. | |

* cited by examiner

*Primary Examiner*—Tuan Ho
(74) *Attorney, Agent, or Firm*—Dawn V. Stephens; Wade James Brady, III; Frederick J. Telecky, Jr.

(57) ABSTRACT

The image sensing system includes integrating charge in an image sensor array; transferring the charge out of the image sensor array; converting the charge to a digital signal; combining the digital signal with digital data stored in a memory device to form an integrated signal; storing the integrated signal in the memory device such that the integrated signal becomes the digital data; and repeating the above steps multiple times during a frame time cycle. This system allows for very small pixel sizes in the image sensor. The digital integration process eliminates the need for using correlated double sampling circuits to reduce kTC noise, and is also beneficial for reduction of analog-to-digital digitization noise.

13 Claims, 1 Drawing Sheet

LOW NOISE IMAGE SENSING SYSTEM AND METHOD FOR USE WITH SENSORS WITH VERY SMALL PIXEL SIZE

FIELD OF THE INVENTION

The present invention relates to solid-state image sensors and specifically to CMOS and CCD image sensors that have very small pixel sizes.

BACKGROUND OF THE INVENTION

A typical image sensor senses light by converting impinging photons into electrons that are integrated (collected) in the image sensing area array of pixels. After completion of integration collected electrons are transported into a suitable storage area by the CCD transfer process and further from the storage area into the detection node where electron signal charge is converted into a voltage. The resulting voltage is then supplied to the output terminals of the sensor. In CMOS image sensors; charge is converted into a voltage directly in the pixels themselves without any transport and the resulting voltage, after appropriate buffering, is delivered to the output terminals through various scanning and addressing means. The description of a CCD image sensor can be found for example in U.S. Pat. No. 6,111,279 to Nakashiba. The description of a CMOS sensor can be found for example in U.S. Pat. No. 6,549,235 to Fossum. As the image sensing technology evolves there are constant demands for performance improvements, more pixels, and a constant demands for reduction of cost. The cost can be directly related to chip size and consequently to the pixel size. It is thus desirable to design high-resolution image sensors that have many pixels with very small size. There are, however, some obstacles and limitations in this process that need to be overcome first. The small pixel size results in smaller sensor sensitivity, since fewer photons impinge on the particular pixel. This could, theoretically, be overcome by longer integration times or more illumination intensity using a faster lens. However, smaller pixels also have a small well capacity and cannot collect (integrate) a sufficient amount of charge. Collection of only a small amount of charge results in large photon noise, which is a consequence of Poisson statistic that describes the random nature of photon arrivals to pixels. The conventional approach to image sensing, with full charge integration in pixels, followed by a subsequent readout, thus cannot be used and a new concept needs to be developed.

SUMMARY OF THE INVENTION

It is an object of the present invention to overcome limitations in prior art. It is further object of the present invention to provide a practical design of image sensing system that uses sensors with very small pixel sizes. It is yet another object of the present invention to provide practical high performance image sensing system designs using sensors with very small pixel sizes that have low photon noise and high Dynamic Range.

Incorporating multiple fast sensor readouts during one frame time cycle, in the image sensing system, followed by signal integration in digital domain, accomplishes this task and other objects of the invention.

DETAILED DESCRIPTION OF PREFERRED EMBODIMENTS

Figure 1:
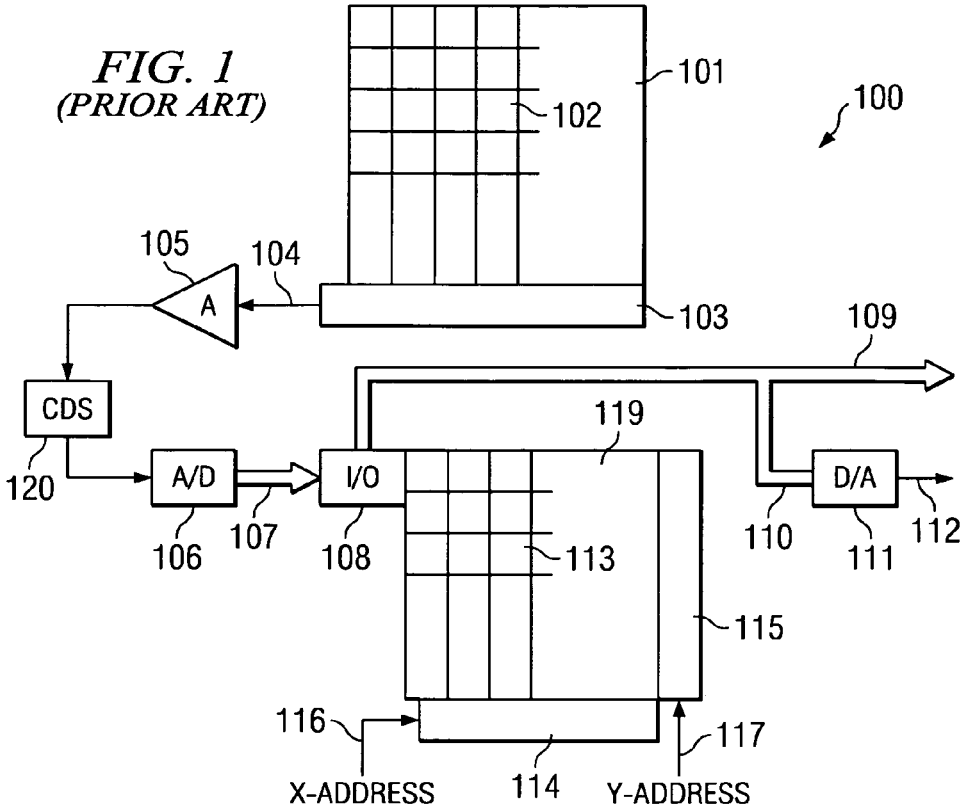
FIG. 1 is a simplified block diagram of a conventional prior art CCD image sensing system.

In FIG. 1 drawing 100 represents a simplified block diagram of a typical prior art image sensing system that consists of array of pixels 101. When light impinges on the array charge is produced in individual pixels 102 and is integrated there. After completion of integration cycle, charge is readout first by shifting the whole line of pixels 102 into serial register 103 and then by shifting individual pixels one-by-one into charge detection node 104 that is buffered by amplifier 105. It is clear to those skilled in the art that CCD image area pixel array 101 can be easily replaced by a CMOS area pixel array and the readout register 103, detection node 104, and buffer amplifier 105, replaced by corresponding CMOS scanning and addressing circuits. For the simplicity of description such an alternative will not be discussed here any further. When the pixels of CMOS array are reset or when charge detection node 104 of the CCD image sensor is reset kTC noise is generated. This noise is typically removed or significantly reduced by a double sampling process called correlated double sampling (CDS) as described for example in U.S. Pat. No. 4,035,629 to Lampe, in U.S. Pat. No. 6,320,616 to Sauer, and in U.S. Pat. No. 6,573,784 B2 to Gower. The kTC noise reduction circuit is indicated by block 120 in FIG. 1 and is inserted in the signal chain just before the signal conversion into a digital form by A/D converter 106. Digital signal 107 is then placed through Input-Output circuits 108 into memory 119 that stores the digital signal of individual pixels in memory locations 113. The memory locations are addressed by addressing circuits 114 and 115 using addressing lines 116 and 117. When it is desirable to read the image data stored in memory, data is accessed using address lines 116 and 117 and data appears on digital buses 109 and 110. The digital data can also be converted back to analog form using D/A converter 111 and the analog signal supplied to the rest of the system using analog line 112. In addition to limitations described previously, resulting from the small pixel size, the conventional image sensing system suffers from large noise floor caused by the buffer amplifier 105, residual kTC noise, and by digitizing noise of A/D converter 106. In order to achieve an acceptable system performance the pixel signal must be sufficiently large and kept well above the noise floor. The dynamic range of the system is thus limited on the high side by the pixel size and its charge storage capacity and on the low side by the noise floor of the amplifier; CDS circuit efficiency, and the A/D converter digitizing noise.

In the present invention, only limited charge integration is necessary in small pixels and the pixels can be read out very fast, several times during one frame time cycle. The output signal can be converted into digital form and the integration completed digitally in a frame memory. In this new concept the signal flow is as follows: partial charge integration in pixels, multiple fast signal readouts during one frame time cycle, A/D conversion, digital integration in memory, storage, and final readout from memory for display or for other signal processing. This is in contrast to the conventional flow, which is as follows: complete charge integration in pixels, normal single readout during one frame time cycle, kTC noise removal using Correlated Double Sampling (CDS), A/D conversion, storage in memory, and final readout from memory for display or for other signal processing.

Figure 2:
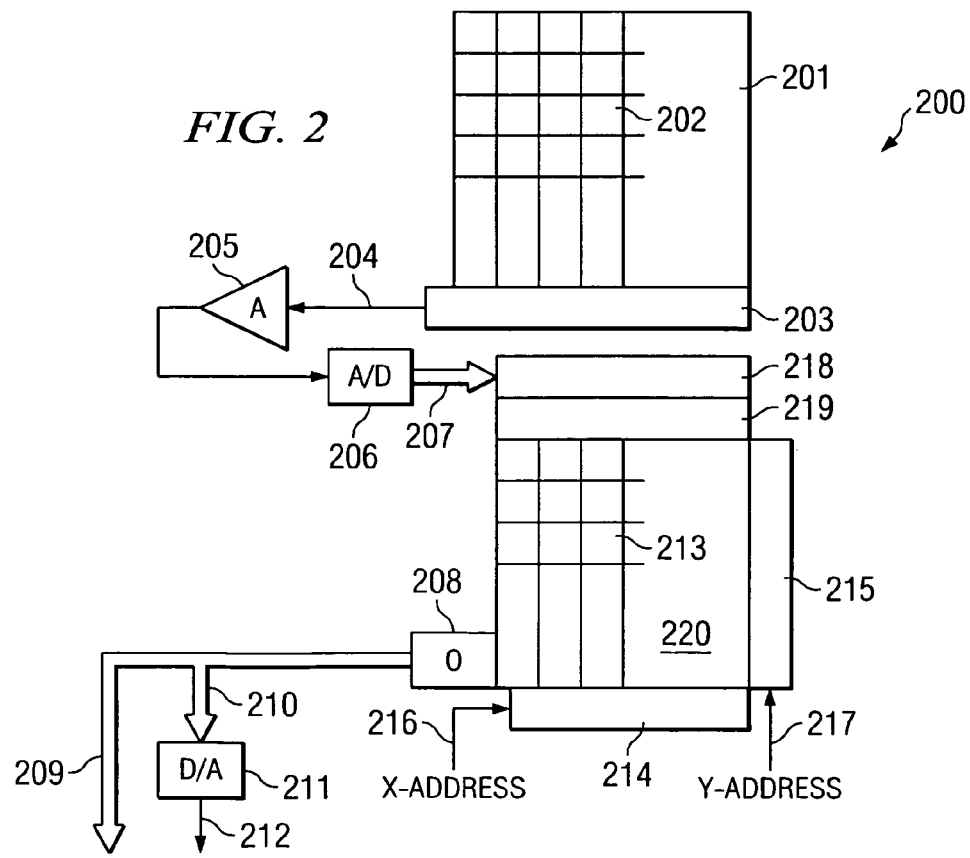
FIG. 2 is a simplified block diagram of a CCD image sensing system according to the present invention, where signal charge is only partially integrated in image area pixels then read out through a conventional amplifier without using CDS noise reduction circuits and converted into a digital form.

In FIG. 2 drawing 200 represents a simplified block diagram of the imaging system of the present invention. In the imaging system of FIG. 2, signal charge is only partially integrated in the sensor pixels due to their small size and is quickly read out several times during one frame time cycle. The signal integration is completed in the digital domain after the analog output is converted to a digital form. The signal integration after readout has many advantages in reducing photon noise; kTC reset noise, and digitization noise as well as in increasing the sensor dynamic range independently of pixel size.

Image sensing area 201, pixels 202, and all the components from 203 to 217 correspond to the same system components from 101 to 117 of drawing 100 shown in FIG. 1. The difference between the conventional and the new system is only in the sensor readout speed, number of readouts in one frame time cycle and in processing the digitized signal. The digital signal received from A/D converter 206 is loaded into digital shift register 218. When a complete line of data is loaded into the register the same line of data from previous scans is fetched from memory 220 and placed into line adder 219. In the subsequent step, the data from register 218 is summed with the data brought back from the memory and the result is placed back into the memory. These steps accomplish the digital pixel integration and memory locations 213 now store the integrated pixel signal. The signal can be read from memory 220 after completion of frame integration time cycle by supplying addressing data through lines 216 and 217 to memory addressing registers 214 and 215. The data appears on digital buses 209 and 210 and after conversion to analog form by D/A converter 211 is available for analog display on line 212.

The above described digital integration concept has several advantages. It is not necessary to use the complex CDS circuit to reduce kTC noise. The multiple readout and integration reduces this noise automatically by an averaging process. The same is true for the digitization errors of A/D converter. The amplifier noise floor is also reduced, but not as much as the kTC noise and digitizing noise. The amplifier must now have a wider bandwidth, and this causes its Johnson noise to increase. However, the bandwidth does not have to be increased as much as it would be necessary if the CDS circuits were used. This provides some noise reduction factor even for the amplifier noise floor. However, the usefulness of this concept becomes most apparent when the system DR is considered. The signal integration is now not limited by the well capacity of the pixels. The pixels can be very small and red out many times during one frame time cycle. The signal is integrated in memory and the integration limit is determined only by the number of bits allocated for the individual memory pixels.

Having described preferred embodiments of novel image sensing systems with CMOS and CCD image sensors that have small pixel sizes, multiple fast readouts during one frame integration time cycle, and with the digital signal integration in frame memory, which are intended to be illustrative and not limiting, it is noted that persons skilled in the art can make modifications and variations in light of the above teachings. It is therefore to be understood that changes may be made in the particular embodiments of the inventions disclosed, which are within the scope and spirit of the inventions as defined by appended claims.

What is claimed is:

1. A method for sensing an image by transforming received light into a sense signal, the method comprising the steps of:
   partially integrating charge, associated with the received light, in an image sensor array;
   transferring the charge out of the image sensor array;
   converting the charge to a digital signal;
   combining the digital signal with digital data stored in a memory device to form an integrated signal;
   storing the integrated signal in the memory device such that the integrated signal becomes the digital data; and
   repeating the above steps N times during a frame time cycle, where N is an integer greater than one, wherein the repeating creates the sensed signal.

2. The method of claim 1 wherein the step of the combining the digital signal with the digital data comprises summing the digital signal and the digital data to form the integrated signal.

3. The method of claim 1 wherein the step of storing the integrated signal comprises storing the integrated signal in addresses corresponding to pixels in the image sensor array.

4. The method of claim 1 wherein the step of combining the digital signal with the digital data comprises:
   loading a line of data from the digital signal into a digital shift register;
   retrieving a data line of the digital data from a corresponding location in the memory device;
   summing the line of data with the data line from the memory device; and
   storing the integrated signal back into the corresponding location in the memory device.

5. A method of sensing an image by transforming received light to an image sensing signal, the method comprising the steps of:
   partially integrating signal charges in sensor pixels associated with the received light;
   completing multiple fast readouts for each frame time cycle of the partially integrated signal charges;
   converting each of the multiple fast readouts from an analog signal to a digital signal;
   loading a complete line of data into a shift register from the multiple fast read outs;
   retrieving a corresponding line of data from a memory and storing the corresponding line of data in a line adder;
   creating a digitally integrated signal by summing the complete line of data and the corresponding line of data; and
   processing the digitally integrated signal to sense the image.

6. An image sensing device comprising:
   an array of image sensing pixels;
   an analog-to-digital converter coupled to an output of the array;
   a digital memory device coupled to an output of the converter, wherein the digital memory device cumulatively combines an output from each pixel with an output from a previous readout of each pixel each time the array of image sensing pixels is readout during a frame time cycle;
   a digital shift register coupled to the output of the analog-to-digital converter;
   an adder coupled to the digital shift register; and
   a digital memory array coupled to the adder.

7. The device of claim 6 further comprising a shift register coupled to the array of image sensing pixels.

8. The device of claim 7 further comprising a buffer amplifier coupled between the shift register and the analog-to-digital converter.

9. The method of claim 5 further comprising reading a digital image signal from the memory device.

10. A method of sensing an image by transforming received light to an image sensing signal, the method comprising the steps of:
   partially integrating signal charges in sensor pixels associated with the received light;
   performing a plurality of fast signal readouts for the signal charges during one frame time cycle;
   performing an analog to digital conversion that produces a plurality of digital signals; and
   performing digital integration of the digital signals in memory.

11. The method of claim 10 further comprising completing a final readout from memory.

12. The method of claim 11, wherein the final read out is either for display or for other signal processing.

13. The method of claim 11, wherein the step of performing digital integration comprises, the steps of:
   loading a line of data from the digital signal into a digital shift register;
   retrieving a data line from a corresponding location in the memory device;
   summing the line of data with the data line from the memory device to form the integrated signal; and
   storing the integrated signal back into the corresponding location in the memory device.

* * * * *